May 12, 1953  J. C. SMITH  2,638,011
TOOTH FORM FOR FLEXIBLE COUPLINGS
Filed Feb. 21, 1951  2 Sheets-Sheet 1

Inventor
John Charles Smith
by Charles A Warren
Attorney

May 12, 1953    J. C. SMITH    2,638,011
TOOTH FORM FOR FLEXIBLE COUPLINGS
Filed Feb. 21, 1951    2 Sheets-Sheet 2
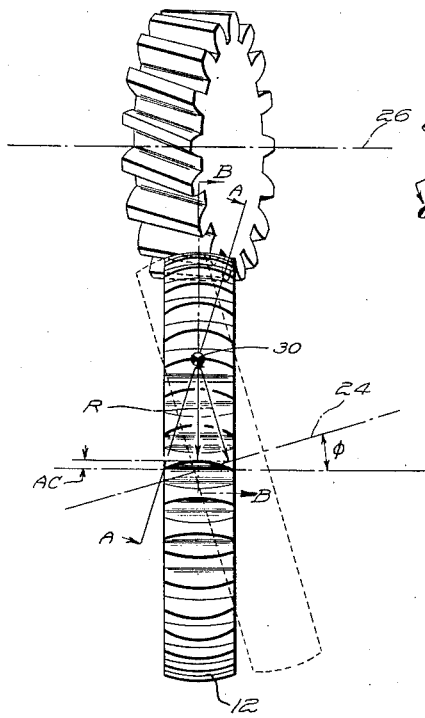
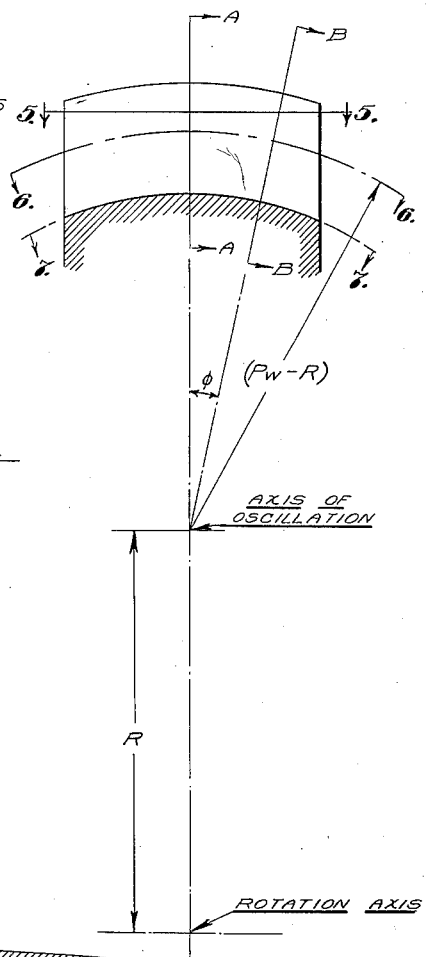
Inventor
John Charles Smith
by Charles A. Warren
Attorney Patented May 12, 1953

2,638,011

UNITED STATES PATENT OFFICE 2,638,011

TOOTH FORM FOR FLEXIBLE COUPLINGS

John Charles Smith, Farmington, Conn., assignor to United Aircraft Corporation, East Hartford, Conn., a corporation of Delaware Application February 21, 1951, Serial No. 212,044

7 Claims. (Cl. 74—462)

This invention relates to gears and splines and particularly to a tooth form adapted for use in a flexible coupling.

One feature of the invention is a gear tooth form such that when the shafting is slightly misaligned the tooth contact will not be concentrated at the ends of the teeth but will be over a localized area near the center of the tooth.

One feature of the invention is a gear tooth form for a spline which will provide a limited misalignment between the two parts of a flexible coupling without interference between the intermeshing teeth and with a localized bearing area spaced from the ends of the teeth.

Another feature is a barrelled or elliptoid external spur tooth such that the tooth will have a true involute form in any engagement plane normal to the pitch surface of the mating internal gear.

Other objects and advantages will be apparent from the specification and claims, and from the accompanying drawings which illustrate an embodiment of the invention.

Fig. 3 is a sectional view along line 3—3 of Fig. 2.

Fig. 4 is an enlarged sectional view taken in a radial plane to show the other form.

Fig. 5 is a sectional view along the line 5—5 of Fig. 4.

Fig. 6 is a sectional view along the line 6—6 of Fig. 4.

Fig. 7 is a sectional view along the line 7—7 of Fig. 4.

Figure 1:
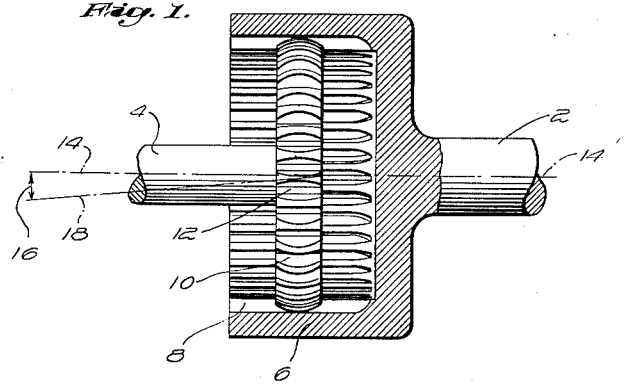
Fig. 1 is a sectional view through a flexible coupling embodying the invention.

The invention is particularly applicable to a tooth form for use in a flexible coupling as shown in Fig. 1 in which driving and driven shafts 2 and 4 are interconnected by the coupling which includes a cylindrical member 6 connected to one of the shafts, as for example the shaft 2, and having spur teeth 8 on its inner surface meshing with teeth 10 on a spline or external gear 12 secured to the other shaft 4. The dot-dash line 14 represents the normal axis of the flexible coupling which is so constructed as to permit a misalignment between the driving and driven shafts by a predetermined amount represented by the angle 16 between the normal axis 14 and the misaligned axis 18 of the shaft 4. The teeth 8 are conventional spur gear teeth and the teeth 10 are made in accordance with this invention in order to provide for proper intermeshing between the teeth 8 and 10 in spite of the misalignment between the driving and driven shafts. Such misalignment will not normally exceed 5°.

Figure 2:
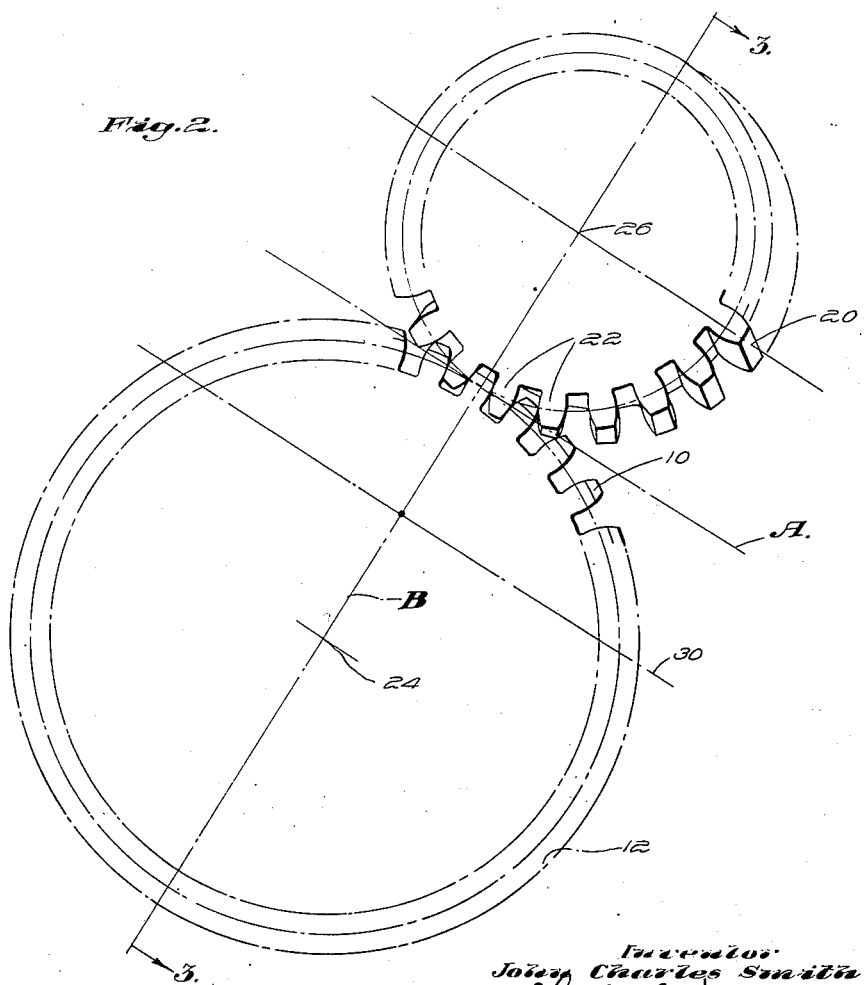
Fig. 2 is a side elevation showing diagrammatically a spline in the process of forming the teeth thereon.

The teeth 10 on the spline 12 are produced by generation, rough cutting and finish shaving a tooth surface which has an arc of curvature in a plane A, Fig. 2, which is parallel to the gear axis and perpendicular to the axial center plane B of the tooth. Only the finish shaving operation is shown in which the cutter 20 is in the form of a helical spur gear, the surfaces of whose teeth are grooved in a plane normal to the cutter axis, so as to produce cutting edges on the tooth surfaces.

The spline 12 is mounted to rotate on its normal axis 24 (a horizontal plane, as shown) and the cutter 20 is mounted to rotate on an axis 26 in a plane generally parallel to the axis 24 (also a horizontal plane, as shown) but set at an angle in that plane equal to the helix angle of the cutter teeth. As will be apparent later, the axes are not in parallel planes at all times by reason of the oscillation of the spline during cutting.

Referring now to Fig. 3, in addition to the rotary movement of the cutter and gear for finish shaving the teeth on the spline, the latter is also oscillated about an axis at right angles to the normal axis of rotation of the spline and also at right angles to the axial plane of the tooth being worked. (This axis would be perpendicular to the plane of the drawing in the arrangement shown). This axis is not coincident with the pitch cylinder axis or the axis of rotation of the spline but is preferably located between the spline axis and the tooth being worked upon as indicated by the line 30 of Fig. 2 (a point 30 in Fig. 3). The spline is oscillated about this axis during the rotation of the cutter and gear such that the entire tooth length is acted upon by the cutter.

The distance between the work axis, that is the axis 24, and the axis of oscillation 30 is a variable which affects the involute form, thickness, and depth of the teeth at any distance from the center of the face. This distance, represented as R in Fig. 3, preferably is one-half the pitch radius for conventional sizes of gears and for small angles of misalignment.

The teeth may be produced in a machine which will support the cutter on a fixed axis and will support the gear such that it may rotate on its own axis while it is being oscillated about the axis 30. While the cutter is at the center of the tooth face the action will be the equivalent of two mating spur gears. As the cutter moves away from the center of the tooth face, the action is equivalent to the action between a spur pinion and a tapered spur gear operating at a variable shaft angle.

The finished tooth has the shape shown in Figs. 4–7, inclusive. The top land of the tooth is wider at the middle than at the ends and tapers toward the ends if the top land surface is cylindrical. The tooth would have a similar shape along any section parallel to the top land.

The area established by intersecting a tooth with a cylindrical surface whose radius is equal to the normal pitch radius of the work minus the distance from the work axis to the axis of oscillation, and whose axis coincides with the axis of oscillation of the work, will be a rectangular area. By normal pitch radius is meant the pitch radius when the axis of the work is in the full line position of Fig. 3.

The thickness of the tooth on this imaginary cylindrical surface will be uniform, but the profile taken in the plane A—A of the work will be the involute of a slightly larger base circle than the base circle of which the profile at section B—B is the involute. The base circle radius A' at section A—A would be obtained by the equation $A' = B \sec \phi$ where B is the base circle radius at section B—B.

At the center of the tooth, the arc tooth thickness $t$ of the work piece is determined by the dimensions of the shaving cutter and the center distance used to finish shave, as in ordinary gear shaving.

The area established by intersecting a tooth with a cylindrical surface whose radius is $P_w$ and whose axis coincides with the gear axis, has a length equal to the face length of the tooth and a maximum width at the center of the face length. This maximum width, $t$, of this area, at the center of the face length is the arc tooth thickness of the tooth at radius $P_w$, and can be calculated by the means ordinarily employed to determine the arc tooth thickness of a gear being cut at a given center distance with a cutter of given dimensions. The width $t'$ of this area at any distance $d$ from the center of the face length can be calculated as follows:

Where $B_c$ is the base circle radius of the spur equivalent of the cutter (see below), $\rho$ is the ratio of the number of teeth in the spur equivalent to the cutter to the number of teeth in the gear being cut, C is the center distance between spur equivalent of cutter and the gear being cut when center section of the gear being cut is active, R is the distance from gear rotational axis to axis of oscillation, $P_w$ is the working pitch radius of the gear at the center of the face length, $\alpha$ is the active pressure angle at the center of the face length, $\alpha'$ is the active pressure angle at the distance $d$, and $\phi$ is the angle of oscillation of the spline when the cutter is operative at the distance $d$, the equations are:

$$P_w = \frac{C}{\rho+1}$$

$$\cos \alpha = \frac{B_c}{\rho P_w}$$

$$\tan \phi = \frac{d}{P_w + R}$$

$$\cos \alpha' = \frac{B_c(\rho + \sec \phi)}{\rho[C + R(\sec \phi - 1)]}$$

$$t' = t - 2P_w(\rho + \sec \phi)(\operatorname{inv} \alpha - \operatorname{inv} \alpha')$$

A circular shaving cutter is essentially a helical gear whose tooth action will be conjugate with a specific basic rack at a specific pitch plane. The dimensions of this basic rack can be determined from the given cutter dimensions by conventional gear calculations. A spur gear with zero helix angle and the same number of teeth as the shaving cutter can be constructed so that it is also conjugate with the basic rack when operating at the same pitch plane. This spur gear is "the spur equivalent of the cutter" and its dimensions can be established by conventional gear calculations.

I claim:

1. A tooth form for a spline having a center of curvature for the tooth form located between the axis of the spline and the pitch circle and in which any tooth form on an arc about said center of curvature is rectangular.

2. A tooth form for a spline having an arc of curvature on the active tooth surface in any plane perpendicular to the axial center plane of the tooth, the tooth thickness being constant on a cylindrical surface, an element of which is tangent to the central pitch circle of the tooth and the axis of which is perpendicular to the central pitch circle axis, the point of tangency being located in the axial center plane of the tooth.

3. A tooth form for a spline having an arc of curvature on the active tooth surface in any plane perpendicular to the axial center plane of the tooth, the tooth thickness being constant on a cylindrical surface, an element of which is tangent to the central pitch circle of the tooth and the axis of which is perpendicular to the central pitch circle axis, the point of tangency being located in the axial center plane of the tooth, the cylindrical radius being less than the central pitch circle radius.

4. A tooth form for a spline having an arc of curvature on the active tooth surface in any plane perpendicular to the axial center plane of the tooth, the tooth thickness being constant on a cylindrical surface, an element of which is tangent to the central pitch circle of the tooth and the axis of which is perpendicular to the central pitch circle axis, the point of tangency being located in the axial center plane of the tooth, the cylindrical radius being equal to one-half the central pitch circle radius.

5. A tooth form for a spline having a center of curvature for the tooth form located on an axis midway between the spline axis and the pitch circle axis, said first axis being located in the plane of the spline.

6. A tooth form for a spline adapted to cooperate with an internal spur gear to form a coupling where there may be misalignment between the axes of the gears to an angle not exceeding five degrees, said tooth form having a variable thickness taper at any selected diameter of the spline, the thickness of the tooth at a distance $d$ from the center of the tooth face on the pitch cylinder being determined by the equation $$t' = t - 2P_w(\rho + \sec \phi)(\operatorname{inv} \alpha - \operatorname{inv} \alpha')$$

where $t$ is the thickness of the tooth at the center of the face length at a radius $P_w$, $P_w$ is the working pitch radius of the spline at the center of the face length of the tooth, $\rho$ is the ratio of the number of teeth in the spur equivalent of the cutter to the number of teeth in the spline being cut, $\phi$ is the angle of oscillation of the spline when the cutter is operative at the distance $d$, $\alpha$ is the active pressure angle at the center of the face length, and $\alpha'$ is the active pressure angle at the distance $d$.

7. A tooth form for a spline which has a maximum thickness at the center section of the tooth length and whose thickness $t'$, measured on the cylindrical surface whose axis coincides with the spline axis and whose radius is equal to the central pitch circle radius, is determined by the equation $$t' = t - 2P_w(\rho + \sec \phi)(\operatorname{inv} \alpha - \operatorname{inv} \alpha')$$

where $t$ is the thickness of the tooth at the center of the face length at a radius $P_w$, $P_w$ is the working pitch radius of the spline at the center of the face length of the tooth, $\rho$ is the ratio of the number of teeth in the spur equivalent of the cutter to the number of teeth in the spline being cut, $\phi$ is the angle of oscillation of the spline when the cutter is operative at the distance $d$, $\alpha$ is the active pressure angle at the center of the face length, and $\alpha'$ is the active pressure angle at the distance $d$, and $d$ is the distance from the center of the tooth face to the point where the thickness $t'$ is to be determined.

JOHN CHARLES SMITH.

References Cited in the file of this patent

UNITED STATES PATENTS

| Number | Name | Date |
| --- | --- | --- |
| 280,428 | Wilkinson | July 3, 1883 |
| 783,719 | Campbell | Feb. 28, 1905 |
| 2,114,807 | McCavitt | Apr. 19, 1938 |
| 2,303,813 | Barcus | Dec. 1, 1942 |
| 2,306,854 | Zimmer | Dec. 29, 1942 |
| 2,346,266 | Montley | Apr. 11, 1944 |
| 2,447,104 | Trbojevich | Aug. 17, 1948 |
| 2,536,343 | Austin | Jan. 2, 1951 |